United States Patent
Miller

(10) Patent No.: US 6,240,802 B1
(45) Date of Patent: Jun. 5, 2001

(54) DEVICE FOR ADJUSTING A TWO-PART GEAR LEVER

(75) Inventor: Lars Miller, Södertälje (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/367,669

(22) PCT Filed: Dec. 16, 1998

(86) PCT No.: PCT/SE98/02333

§ 371 Date: Aug. 18, 1999

§ 102(e) Date: Aug. 18, 1999

(87) PCT Pub. No.: WO99/33681

PCT Pub. Date: Jul. 8, 1999

(30) Foreign Application Priority Data

Dec. 18, 1997 (SE) .................................................. 9704726

(51) Int. Cl.⁷ ...................................................... G05G 1/04
(52) U.S. Cl. ................................. 74/523; 74/525; 403/4
(58) Field of Search ........................... 74/523, 524, 525, 74/548, 473.34, 473.1; 403/3, 4, 84, 86, 87

(56) References Cited

U.S. PATENT DOCUMENTS

| | | | |
|---|---|---|---|
| 1,547,819 | * 7/1925 | Paul | 74/524 |
| 1,719,368 | * 7/1929 | Hibbets | 74/524 |
| 1,743,241 | * 1/1930 | Schmidt | 74/524 |
| 2,926,032 | * 2/1960 | Cook | 403/86 |
| 2,985,474 | * 5/1961 | Cook | 403/86 |
| 3,251,237 | * 5/1966 | Warmkessel | 74/473.34 |
| 3,414,908 | * 12/1968 | Waggott et al. | 403/84 |
| 4,064,767 | * 12/1977 | Boersma | 74/523 |
| 4,243,339 | * 1/1981 | Dickerson | 403/4 |
| 4,541,257 | * 9/1985 | Stoll | 74/523 |
| 4,569,246 | * 2/1986 | Katayama et al. | 74/523 |
| 4,603,598 | * 8/1986 | Tsuji et al. | 74/523 |
| 4,960,009 | * 10/1990 | Schultz et al. | 74/523 |
| 5,144,853 | 9/1992 | Giudici | 74/473 |
| 5,328,285 | * 7/1994 | Grubbs et al. | 74/524 |
| 6,029,535 | * 2/2000 | Kenny et al. | 74/524 |
| 6,082,216 | * 7/2000 | Watanabe et al. | 74/523 |

FOREIGN PATENT DOCUMENTS

| | | |
|---|---|---|
| 3613480 | 11/1987 | (DE) . |
| 2752779 | 3/1998 | (FR) . |
| 439464 | 6/1985 | (SE) . |

* cited by examiner

Primary Examiner—David A. Bucci
Assistant Examiner—Chong H. Kim
(74) Attorney, Agent, or Firm—Ostrolenk, Faber, Gerb & Soffen, LLP

(57) ABSTRACT

Arrangement for manually altering the mutual position setting in a lateral direction of the first and second parts of a two-part gear lever (2) mounted articulately in a vehicle, where the first part is an upper lever element (6) and the second part is a lower lever element (8) articulately connected to the upper lever element by means of a link which incorporates a first articulating device (14) fastened in the lower end of the upper lever element and articulately connected to a second articulating device (18) fitted at the upper end of the lower lever element. Between the lever elements (6, 8) there is a locking arrangement (64) which normally prevents manual pivoting of the lever elements in the link. The first articulating device is a guide sleeve (14) which has a cylindrical aperture (16) running through it and is mounted for rotation on a second articulating device consisting of a bearing bushing unit (18) which is mounted on, and for joint rotation with, a supporting spindle (20). This spindle runs through the bearing bushing unit via a cylindrical hole (22) which is situated in the latter and whose centerline forms an acute angle with the centerline of the aperture (16) running through the guide sleeve. The supporting spindle (20) is fitted in a holder (24) fastened in the upper end of the lower lever element (8).

9 Claims, 3 Drawing Sheets

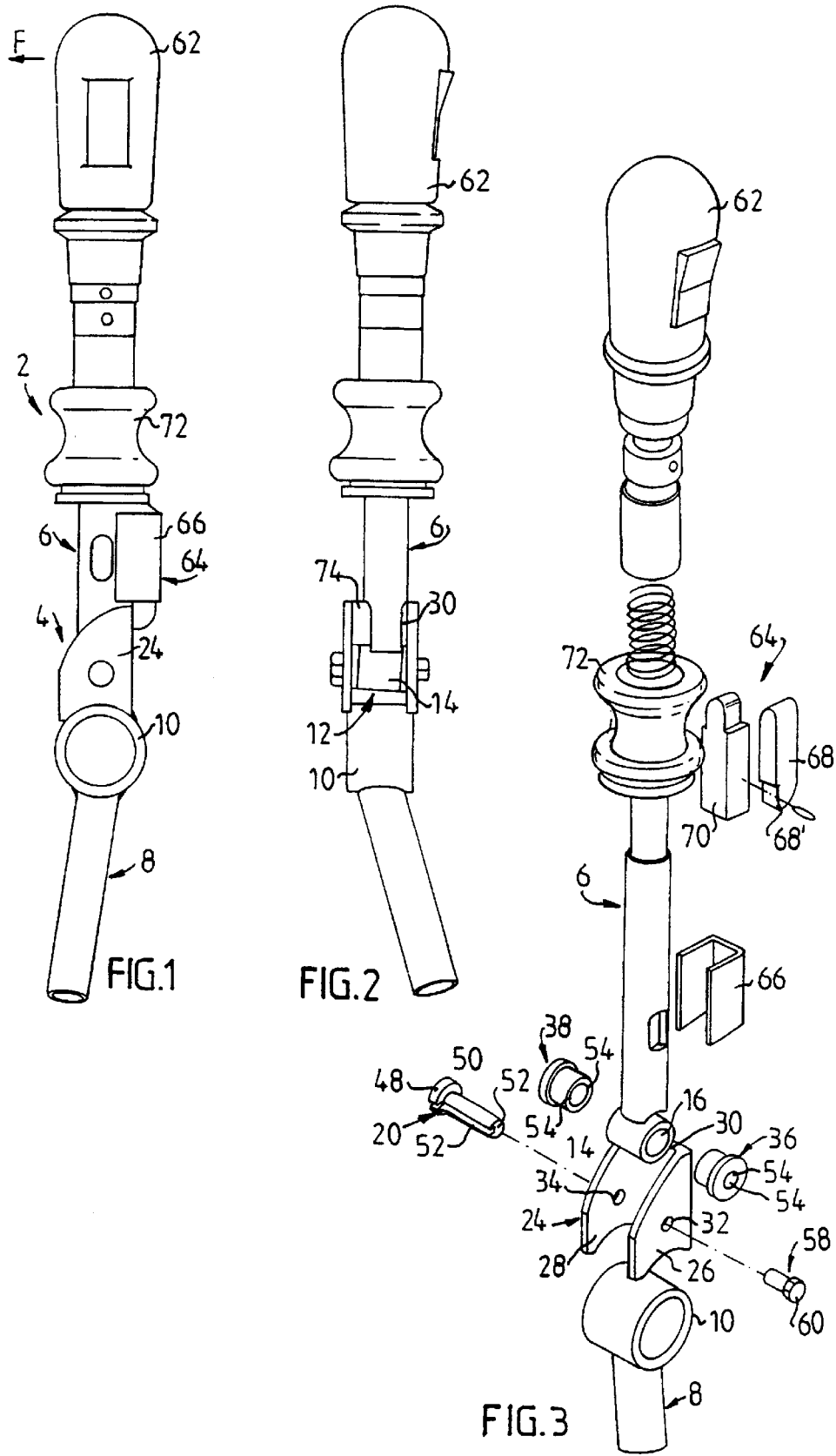

DEVICE FOR ADJUSTING A TWO-PART GEAR LEVER

The present invention relates to an arrangement of the kind for manually altering the mutual position setting of a first part and a second part of a two-part gear lever mounted articulatedly in a vehicle, where the first part is an upper lever element and the second part is a lower lever element articulatedly connected to the upper lever element by means of a link which incorporates a first articulating device fixed to the lower end of the upper lever element and articulatedly connected to a upper end of the lower lever element, while a locking arrangement operative between the lever elements normally prevents mutual pivoting of the lever elements in the link. Such an arrangement makes it possible to alter the mutual position of the gear lever elements which constitute a two-part gear lever.

STATE OF THE ART

Two-part gear levers consisting of a first gear lever element and a second gear lever element joined to the first are already known and may on a truck, for example, consist of an upper lever element which has its lower end articulatedly connected to the upper end of a lower lever element. The two lever elements are then normally fixed (i.e. positionally locked) relative to one another by means of a locking arrangement or locking mechanism situated between them which, in its activated locking position, prevents mutual movement between the lever elements which together constitute the gear lever. The whole of the gear lever thus composed of the two lever elements is usually mounted movably in the vehicle either in a special lever stand under the floor of the driving cab or in an element connected to the gearbox housing. This movable mounting of the whole gear lever is usually situated in the region of the lower lever element and allows pivoting of the gear lever about two perpendicular geometrical axes so that the driver can operate the gear lever both in the longitudinal direction of the vehicle and in its transverse direction in order to select desired gear changes.

Such a gear lever design is previously known from, for example, Swedish patent specification 8103461-3. However, the latter concerns a gear lever arrangement particularly intended for cab-over-engine trucks in which it has to be possible for the driving cab to be tilted forwards so that the engine and gearbox (which are situated under the driving cab) become accessible for servicing/repair. This entails the problem that the gear lever constitutes an obstacle to tilting the driving cab forwards unless special constructional solutions are adopted. According to that patent specification, the gear lever therefore takes the form of a two-part design whereby the two lever elements are mutually fixed by means of a locking mechanism operative between them. The locking function of this locking mechanism can nevertheless be neutralised when tilting the cab forwards, so that the upper lever element can at the same time also be lowered forward. To this end, the locking mechanism has a disengaging device which, during the tilting operation, is acted upon, by a special element fastened to the cab, whereby the locking function of the locking mechanism is neutralized.

OBJECT OF THE INVENTION

The design of the working environment in a vehicle when being by a driver has in recent years come to attract increasing attention. This does of course apply particularly to the environment in the driving cab of a utility vehicle such as a truck, since the environment in such a driving cab constitutes the workplace in which the driver often spends a number of hours per period of work.

There are numerous reasons for attaching ever increasing importance to achieving as good a working environment as possible in utility vehicles. One important reason is of course traffic safety, since a driver working in a good driving cab environment is known to be a substantially better driver than a driver in a bad cab environment. It is therefore important that the driving cab be properly sound-insulated and that the air temperature in the cab can be maintained at a pleasant level. It is also very important that the driver sits comfortably in the driving seat so that he does not suffer from "body fatigue" even during long periods of driving. A great deal of effort has therefore been devoted to making driving seats in trucks as comfortable as possible, including by all kinds of seat setting facilities and electronic setting memories which are very practical where the same vehicle is used by various drivers. Ergonomic thinking applies, however, not only to driving seat design but also to, for example, the design and location of instruments and various kinds of controls and buttons (switches).

The present invention is primarily focused on problems pertaining to the placing and location of the gear lever in the lateral direction relative to the driver/driving seat and, in this context, particularly the location of the gripping part of the gear lever (gear lever knob) in the initial situation before gear change, i.e. the basic setting position (neutral position). Drivers who differ in physique, arm length, shoulder width etc. have the right to expect the gear lever to be nevertheless located in an optimum manner relative to the driving seat, and this demand for settability cannot be met by merely altering the seat setting, since a change in the location of the seat relative to the gear lever may result in correct setting of the seat being impaired or made impossible relative to, for example, the pedals.

DESCRIPTION OF THE INVENTION

In an arrangement of the kind indicated in the introduction, the abovementioned problems can be solved by the arrangement wherein the first articulating device is a guide sleeve which has a cylindrical aperture running through it and is mounted for rotation on the second articulating device consisting of a bearing bushing unit which is mounted on, and for mutual rotation with, a supporting spindle which extends through the bearing bushing unit via a cylindrical hole which is situated in the latter and whose central axis forms an acute angle with the central axis of the aperture running through the guide sleeve, which supporting spindle is fitted in a holder fastened in the upper end of the lower lever element.

A distinguishing feature of such an arrangement is that the first articulating device is a guide sleeve which has a cylindrical aperture running through it and is mounted for rotation on the second articulating device, which takes the form of a bearing bushing unit mounted on, and for joint rotation with, a supporting spindle which extends through the bearing bushing unit via a cylindrical hole situated in the latter. At the same time, this cylindrical hole in the bearing bushing unit extends through the bearing bushing unit in such a way that the central axis of the hole forms an acute angle with the central axis of the aperture running through the guide sleeve, and the supporting spindle supporting the bearing bushing unit for joint rotation with the latter is fitted in a holder which is fastened in the upper end of the lower lever element.

On a two-part gear lever provided with an arrangement according to the invention, the position of the gripping part of the gear lever (the gear lever knob) can thus be adjusted in the transverse direction of the vehicle, i.e. in a lateral direction relative to the driving seat, by rotating the bearing bushing unit which is mounted obliquely (eccentrically) on, and for joint rotation with, the supporting spindle and also acts as an eccentric bushing unit. Rotation of the bushing unit in the holder is purely by rotation of the supporting spindle, thereby altering the position of the upper lever element in the lateral direction. The outer locations for this lateral change in position of the upper end of the gear lever are reached at the outer limits of a maximum 180° range of angle of rotation.

Further developments and preferred embodiments of the arrangement are described as follows A preferred embodiment of the bearing bushing unit whereby the latter comprises a pair of mutually opposite bearing bushings provided with cylindrical bushing portions facing towards one another, by means of which the bushings, from opposite ends of the guide sleeve protrude into the cylindrical aperture running through the guide sleeve.

In one preferred embodiment the bushings are characterized in that the regions of the bearing bushings which are axially outside the ends of the guide sleeve are provided with radially expanded end portions which are wedge-shaped as seen in side view and exhibit on one side a circular shoulder surface abutting against the respective adjacent end surface of the guide sleeve, and on the other side a planar end surface abutting against an adjacent planar surface of the holder.

The holder fastened in the upper end of the lower lever element may appropriately be a metal yoke which is fastened to the outside of a bearing sleeve at the upper end of the lower lever element and incorporates two mutually parallel flanges with coaxially situated holes running through them to accommodate the end portions of the supporting spindle characterized in that the supporting spindle is a bolt which has a head and a cylindrical shank and which has in its shell surface at least one, preferably two, diametrically opposite, axial longitudinal groove/grooves, with which, owing to their shape, finlike axial protrusions on the inside of the cylindrical hole in the bearing bushings engage positively so that the supporting spindle forms together with the bearing bushings a mounting device, rotatable as a unit, for the guide sleeve in the lower end of the upper lever element.

The supporting spindle may form together with the bearing bushings an integral rotatable mounting device characterized in that the supporting spindle is a bolt which has a head and a cylindrical shank and which has in its shell surface at least one, preferably two diametrically opposite, axial longitudinal groove/grooves with which, owing to their shape, finlike axial protrusions on the inside of the cylindrical hole in the bearing bushings engage positively so that the supporting spindle forms together with the bearing bushings a mounting device, rotatable as a unit, for the guide sleeve in the lower end of the upper lever element.

The supporting spindle in the form of a bolt provided with a head may be fitted in the holder by means of a locking screw. In this embodiment the bolt shank has an axial, internally threaded drilled hole which is open at the opposite end of the shank from the head, and into this threaded hole is screwed a stud whose head/nut is tightened against the outside of one flange of the holder when the head of the bolt is applied against the outside of the other flange of the holder.

A suitable version of the orientation of the arrangement in the driving cab for a vehicle is characterized in that the supporting spindle carrying, and jointly rotating with the bearing bushing unit is at least approximately directed transverse to the longitudinal axis or direction of the vehicle, and rotation of the supporting spindle relative to the holder alters the angular setting in the transverse direction of the vehicle of the upper level element relative to the holder and the lower lever element and hence causes a lateral relocation within the vehicle's driving cab of the upper end portion of the upper gear lever element which bears the gripping part of the gear lever.

BRIEF DESCRIPTION OF THE DRAWINGS

The arrangement according to the invention will now be described below and explained further with reference to embodiments of the arrangement and constructional details incorporated in them, as depicted schematically in the attached drawings, which are as follows:

FIG. 1 shows in side view a first embodiment of a two-part gear lever provided with a setting arrangement according to the invention;

FIG. 2 shows the gear lever according to FIG. 1 as seen from the front;

FIG. 3 shows an exploded view of the gear lever depicted in FIGS. 1–2;

DESCRIPTION OF EMBODIMENTS

Figure 4A:
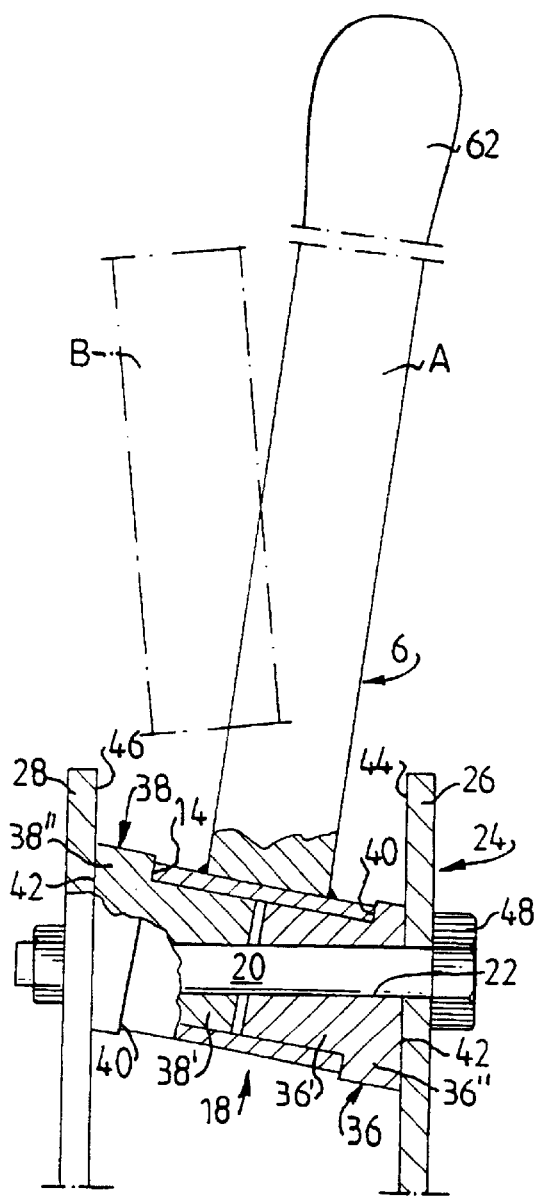
FIGS. 4a and 4b show schematic longitudinal sections through the articulatable mounting of the first articulating device on the second articulating device in two different positional settings of the upper lever element relative to the holder in the upper end of the lower lever element.

FIGS. 1–3 show a two-part gear lever designated as a whole by reference notation 2 and provided with a position setting arrangement 4 according to the present invention. The gear lever 2, which is intended for a motor vehicle, particularly a truck, is composed of a first, upper, gear lever element 6 and a second, lower, gear lever element 8 which is connected articulatedly to the first and is settable in a lateral direction. The gear lever 2 as a whole is intended, in a conventional manner, to be pivotably supported for movement in the vehicle by means of a universal joint in a lever stand under the floor of the driving cab or in an element belonging to the gearbox. All that is depicted here of this universal joint is a bearing sleeve 10 which is firmly welded in the upper portion of the lower lever element 8 and is intended to be supported by an undepicted supporting journal on which the sleeve 10 is supported by means of undepicted rolling bearings, e.g. ball bearings. The undepicted lower end of the lower lever element 8 is intended, in a conventional manner, to be articulatedly connected to a gearchange rod which acts upon a gearshift mechanism belonging to the gearbox.

The upper gear lever element 6 is connected articulatedly and settably to the lower gear lever element 8 by a hingelike link 12 comprising two articulating devices, one of them being a first articulating device fastened in the lower end of the upper lever element 6, the other a second articulating device which is fitted to the upper end of the lower lever element 8 and on which the first articulating device is mounted for rotation. The first articulating device takes the form of a guide sleeve 14 which is firmly welded in the lower end of the upper lever element 6 and has running through it a cylindrical aperture 16. The guide sleeve 14 is mounted for rotation on the second articulating device, which consists of a bearing bushing unit 18. This bearing bushing unit is mounted for rotation on a supporting spindle 20 which extends through the bearing bushing unit 18 via a cylindrical hole 22 situated in the latter. As illustrated in FIG. 2 and particularly in FIG. 4 the cylindrical hole 22 in the bearing bushing unit is situated and directed in such a way that the geometrical central axis of the hole forms an acute angle with the central axis of the aperture 16 running through the guide sleeve 14. This "oblique mounting angle" may for example be of the order of 2°–7°, preferably about 4°. The supporting spindle 20 which thus supports the bearing bushing unit 18 is fitted in a holder 24 which is firmly welded to the outside of the bearing sleeve 10 in the upper end of the lower lever element 8.

As most clearly indicated in the exploded view in FIG. 3, the metal holder 24 takes the form of a yoke which is approximately U-shaped in cross-section and firmly welded to the bearing sleeve 10 and incorporates two mutually parallel flanges 26,28 joined by a planar and essentially rectangular web 30. The flanges 26 and 28 are provided with coaxially situated holes 32 and 34 respectively running through them to accommodate the end portions of the supporting spindle 20.

As indicated most clearly in FIG. 4, the bearing bushing unit 18 takes the form of a pair of separate and mutually opposite bearing bushings 36 and 38 provided with cylindrical bushing portions 36', 38' facing towards one another. The bushing portions 36', 38' of the bearing bushings thus protrude into the cylindrical aperture 16 in the guide sleeve 14 from opposite ends of the sleeve. In the regions axially outside the ends of the guide sleeve 14, the bearing bushings 36, 38 also have radially expanded end portions 36" and 38" respectively. These end portions are wedge-shaped as seen in side view and exhibit on one side a circular shoulder surface 40 abutting against the respective end surface of the guide sleeve 14, and on the other side a planar outer 42 abutting against the planar insides 44 and 46 respectively of the adjacent yoke flanges 26 and 28. The bearing bushings are preferably made of plastic, e.g. urethane plastic (PUR).

Reference will now be made to FIGS. 3–4 and FIGS. 9a–9b which show that the supporting spindle 20 is a bolt or screw with a head 48 and a cylindrical shank 50. This bolt is fitted in the holder 24 by the bolt shank 50 being inserted through the hole 34 in the flange 28. In the shell or outer surface of the bolt shank 50 there are two diametrically opposite and axially longitudinal grooves 52, and on the inside of the cylindrical hole 22 in the bearing bushings 36, 38 there are corresponding diametrically opposite and axially longitudinal finlike protrusions or splines 54 intended to engage in the longitudinal grooves 52 in the bolt when the bearing bushing unit 18 is fitted on the bolt shank 50 in the space between the yoke flanges 26,28. The supporting spindle 20 thus consisting of a bolt provided with a head therefore forms together with the bearing bushings 36, 38 a mounting device, rotatable as a unit, for the guide sleeve 14 in the lower end of the upper lever element 6.

Figure 9A:
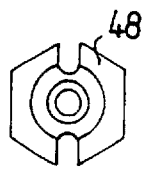
FIGS. 9a and 9b respectively show an end view and a side view of a supporting spindle, in the form of a bolt provided with a head, for the bearing bushing unit according to FIGS. 5–6.
Figure 7:
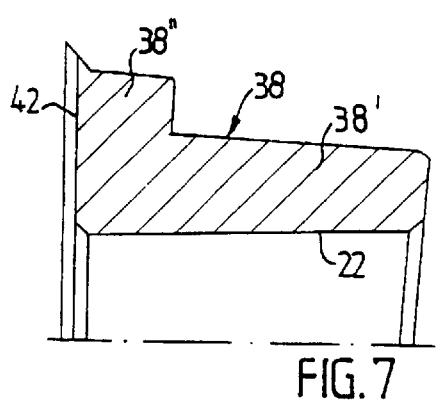
FIG. 7 shows a radial section through the sleeve wall of a bearing bushing of the type depicted in FIG. 4.
Figure 9B:
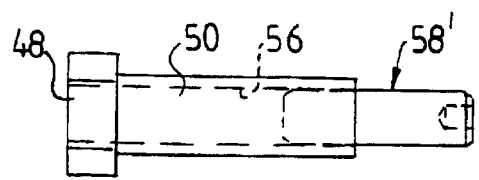

In the embodiment depicted in FIGS. 9a–9b of the headed bolt serving as a supporting spindle, there is in the bolt shank 50 an axial, internally threaded, drilled hole 56 which has its open end at the opposite end of the shank from the head 48. A counterscrew 58 is finally screwed into this threaded hole 56 via the hole 32 in the yoke flange 26, and the head 60 of this counterscrew is tightened against the outside of the flange 26 when the head 48 of the supporting bolt 20 is applied against the outside of the other flange 28 of the holder 24. In the version according to FIGS. 9a–9b, the locking screw 58' takes the form of a headless externally threaded stud onto which an undepicted special locknut corresponding to the head 60 of the locking screw 58 is screwed.

Figure 8:
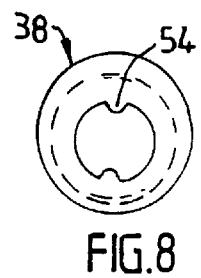
FIG. 8 shows an end view of the bearing bushings depicted in FIG. 3.

The bushings 36,38 are thus connected to, and for joint rotation with, the bolt serving as the supporting spindle 20 by the fact that the shape of the axial protrusions 54 depicted in FIGS. 3 and 8 (on the inside of the hole 22 in the bushings) causes them to engage positively with the cooperating axial grooves 52 (see FIG. 3) in the bolt shank 50. The supporting spindle thus forms together with the bushings a mounting device, rotatable as a unit (36,38,20), for the guide sleeve 14. The mounting device can then be rotated by using, for example, a box wrench to turn the bolthead 48.

Figure 4B:
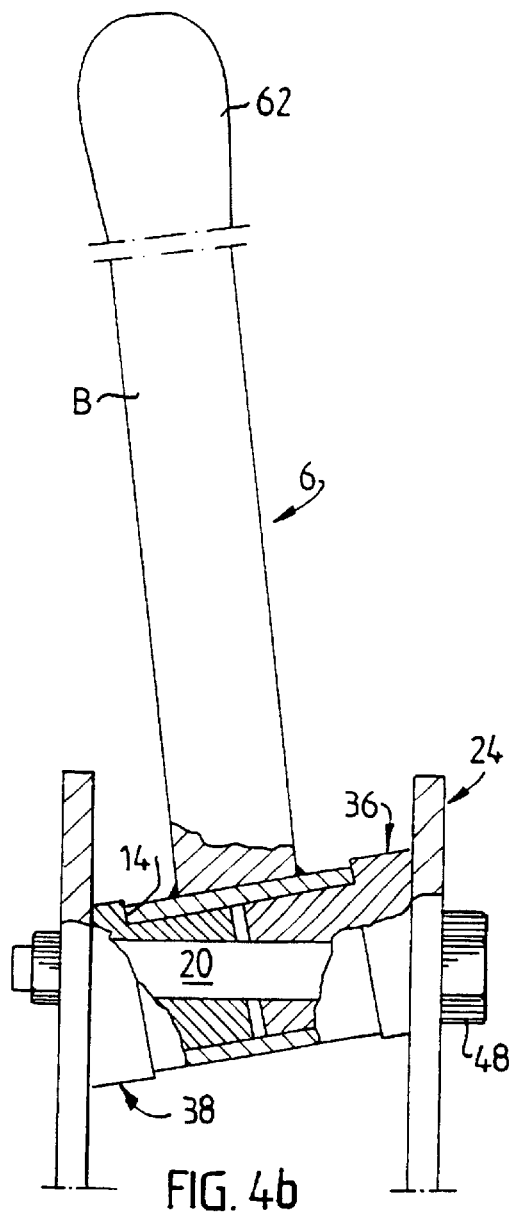

If the gear lever is now placed in the neutral position (N) and the vehicle driver for any reason wishes to alter the basic setting position in the lateral direction of the gear lever element operated by him, i.e. in practice the location of the gear lever knob 62 (the gripping part) which is the highest part of the upper gear lever element 6, he can thus easily do so by using, for example, a box wrench to turn the supporting spindle 20 of the eccentrically mounted bearing bushing unit 18 through a suitable angle within a range of angle of rotation of not more than 180°. The setting position of the upper lever element 6 laterally relative to the holder 24 and the lower lever element 8 can thus be altered between the extreme position A represented by a continuous contour in FIG. 4a and the extreme position B represented by a broken contour. FIG. 4b shows this lever element position B in the form of a continuous contour line, with the mounting device 36, 38, 20 turned 180° from the initial position depicted in FIG. 4a and the lever element 6 relocated in the lateral direction (i.e. transverse to the longitudinal direction of the vehicle) from setting position A to position B.

As indicated by the embodiments depicted in FIGS. 1–3 and FIGS. 5–6 respectively, it is also the case that the upper lever element 6 could be pivoted (lowered) forwards (in direction F) relative to the lower lever element 8 (since the guide sleeve 14 is mounted for rotation on the bearing bushing unit 18) if this was not prevented by a locking arrangement operative between them, such as the locking arrangement designated here by the general reference notation 64. This locking arrangement incorporates a locking mechanism which is mounted on the upper lever element 6 and surrounded by a cover 66 which is U-shaped in cross-section. As indicated in FIG. 3, the locking mechanism incorporates a locking bar 68 mounted for pivoting in a holder 70 fastened in a handgrip 72 which is arranged movably on the lever element 6 and which the driver can pull upwards along the lever element 6. The tip 68' of the locking bar 68 is thus released from its locking contact with the uppermost portion 74 of the rear web 30 of the holder 24. Thereafter the gear element 6 can be pivoted forwards (in direction F) about the bushing unit 18. This forward pivotability/lowerability may for example be necessary where the vehicle which incorporates the gear lever is a cabover-engine truck in which it has to be possible to tilt the driving cab forwards. The special type of locking arrangement 64 briefly described above nevertheless constitutes merely one arbitrary example of a locking arrangement which will normally hold the gear lever elements 6,8 in a mutually locked position.

Figure 5:
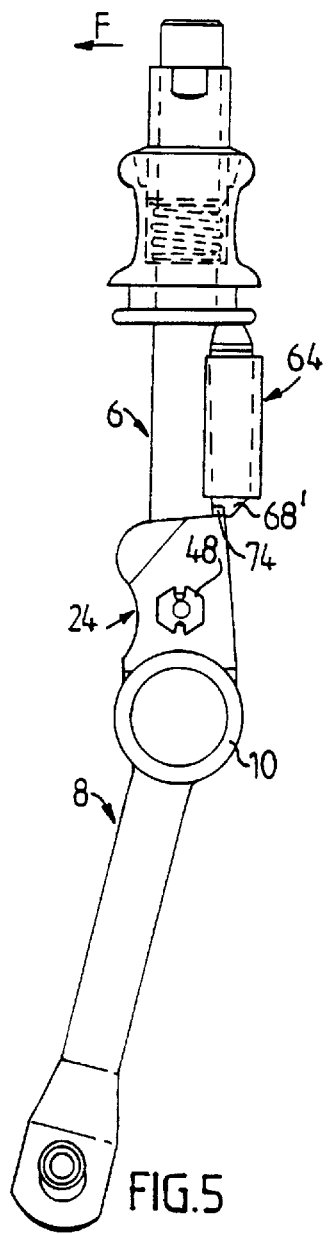
FIG. 5 shows a side view of another, somewhat different, embodiment of a two-part gear lever provided with a setting arrangement according to the invention.
Figure 6:
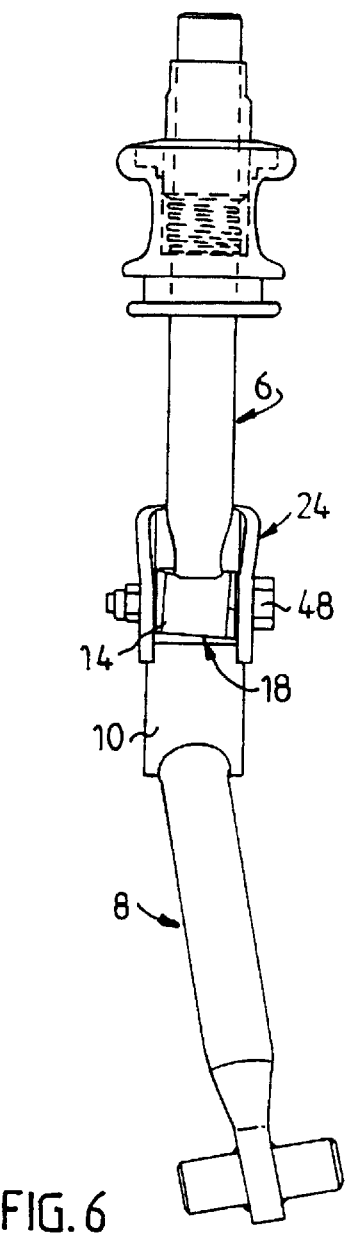
FIG. 6 shows the gear lever according to FIG. 5 as seen from the front.

The embodiment depicted in FIGS. 5–6 differs insignificantly from that depicted in FIGS. 1–3 and its main purpose is to illustrate a conceivable commercially designed version. The constituent elements and parts of the version according to FIGS. 5–6 have the same reference notations as corresponding elements/parts in FIGS. 1–3.

What is claimed is:

1. A gear lever apparatus for use in a motor vehicle having a longitudinal axis corresponding to its direction of forward motion, said gear lever apparatus comprising:

an upper lever element and a lower lever element defining a two-part gear lever, wherein the apparatus is operable for manually altering the relative position setting, in a direction transverse to said longitudinal axis of said vehicle, of said upper lever element relative to said lower lever element of said two-part gear lever; said gear lever being mounted articulately in a vehicle, said upper lever element having a lower end, said lower lever element having an upper end.

said apparatus further including a link articulately connecting said upper and lower lever elements, said link comprising
      a first articulating device fixed to said lower end of said upper lever element, said first articulating device comprising a guide sleeve having a cylindrical bore therethrough,
      a second articulating device fixed to said upper end of said lower lever element, said second articulating device comprising a bearing bushing unit which is rotatably mounted in said bore of said guide sleeve and a supporting spindle mounted to said second articulating device, said supporting spindle extending through said bearing bushing unit mounted thereon, said bearing bushing unit and said guide sleeve having the same central axis,
      said supporting spindle having a central axis which defines an acute angle with the central axis of said bearing bushing unit and said guide sleeve, and a lock operative between said upper and lower lever elements which releasably locks said upper lever element from pivoting relative to said lower lever element, means for releasing said lock and rotating said bearing bushing unit relative to said supporting spindle, said lock comprising threaded means engaging said supporting spindle and said second articulating device, and tightening said threaded means prevents rotation of said supporting spindle and said bearing bushing unit coupled thereto relative to said second articulating device,
      whereby rotation of said bearing bushing unit about said central axis of said supporting spindle causes the central axis of said bearing bushing unit and said guide sleeve to change, thereby causing the same angular change in said upper lever element fixed to said first articulating device relative to said lower lever element.

2. Apparatus according to claim 1, wherein said supporting spindle and said bearing bushing unit through which said supporting spindle extends are coupled for mutual rotation only.

3. A gear lever apparatus for use in a motor vehicle having a longitudinal axis corresponding to its direction of forward motion, said gear lever apparatus comprising: an upper lever element and a lower lever element defining a two-part gear lever, wherein the apparatus is operable for manually altering the relative position setting, in a direction transverse to said longitudinal axis of said vehicle, of said upper lever element relative to said lower lever element of said two-part gear lever; said gear lever being mounted articulately in a vehicle, said upper lever element having a lower end;

said lower lever element having an upper end, said apparatus further including a link articulately connecting said upper and lower lever elements, said link comprising
      a first articulating device fixed to said lower end of said upper lever element, said first articulating device comprising a guide sleeve having a cylindrical bore therethrough,
      a second articulating device fixed to said upper end of said lower lever element, said second articulating device comprising a bearing bushing unit which is rotatably mounted in said bore of said guide sleeve and a supporting spindle mounted to said second articulating device, said supporting spindle extending through said bearing bushing unit mounted thereon, said bearing bushing unit and said guide sleeve having the same central axis,
      said bearing bushing unit comprises a pair of mutually opposite bearing bushings provided respectively with cylindrical bushing portions which are facing towards one another and which protrude into opposite ends of said bore of said guide sleeve,
      said supporting spindle having a central axis which defines an acute angle with the central axis of said bearing bushing unit and said guide sleeve, and
      a lock operative between said upper and lower lever elements which releasably locks said upper lever element from pivoting relative to said lower lever element, means for releasing said lock and rotating said bearing bushing unit relative to said supporting spindle,
      whereby rotation of said bearing bushing unit about said central axis of said supporting spindle causes the central axis of said bearing bushing unit and said guide sleeve to change, thereby causing the same angular change in said upper lever element fixed to said first articulating device relative to said lower lever element.

4. Apparatus according to claim 3, wherein said guide sleeve has opposite ends, and wherein said bearing bushings respectively have first regions situated in the bore of said guide sleeve and second regions situated outside said ends of said guide sleeve,
   said second regions having greater radial diameter than said first regions and having planar outer end surfaces,
   said second articulating device having a pair of planar surfaces spaced apart a distance between which is situated in said bearing bushing unit with said planar end surfaces of said bearing bushing unit abutting said planar surfaces of said second articulating device.

5. Apparatus according to claim 4, wherein said second articulating device further comprises a holder through which said supporting spindle extends, said holder comprising a metal yoke defining a pair of mutually parallel flanges defining said pair of facing planar surfaces, said flanges each defining a hole therein, said holes being coaxial and through which said supporting spindle extends.

6. Apparatus according to claim 3, wherein said supporting spindle is a bolt having a head and a cylindrical shank and having in its outer surface at least one axial groove, and wherein said pair of bearing bushings each has at least one axially and radially extending spline, said splines of said bushings being positively engaged in said at least one axial groove, whereby said supporting spindle and said bushings are only mutually rotatable when said bolt and said bearing bushing unit are rotated relative to said second articulating device.

7. Apparatus according to claim 5, wherein said supporting spindle is a bolt having a head and a cylindrical shank and having in its outer surface at least one axial groove, and wherein said pair of bearing bushings each has at least one axially and radially extending spline, said splines of said bushings being positively engaged in said at least one axial groove, whereby said supporting spindle and said bushings are only mutually rotatable when said bolt and said bearing bushing unit are rotated relative to said second articulating device.

8. Apparatus according to claim 7, wherein said shank of said bolt defines therein an axial, internally threaded hole which is open at the opposite end of the shank from said head, and said supporting spindle further comprises a screw having a shank and a screw head with said shank threadedly insertable into said hole and with said screw head tightenable against the outside of one of said flanges of said holder when applied therein.

9. Apparatus according to claim 2, wherein said central axis of said supporting spindle and bearing bushing unit is transverse to said longitudinal axis of said vehicle, and wherein rotation of said supporting spindle and second articulating device alters said position setting in said transverse direction of said upper lever element and causes a transverse relation of said upper lever element.

* * * * *